United States Patent
Brewer et al.

(10) Patent No.: US 7,107,378 B1
(45) Date of Patent: Sep. 12, 2006

(54) COOPERATIVE INTERCONNECTION AND OPERATION OF A NON-VOLATILE MEMORY CARD AND AN INPUT-OUTPUT CARD

(75) Inventors: Wesley G. Brewer, Los Gatos, CA (US); Michael L. Gifford, San Leandro, CA (US); Yoram Cedar, Cupertino, CA (US); Leonard L. Ott, Fremont, CA (US); Robert F. Wallace, Sunnyvale, CA (US); Kevin J. Mills, Palo Alto, CA (US); Robert C. Miller, San Jose, CA (US)

(73) Assignees: SanDisk Corporation, Milpitas, CA (US); Socket Communications, Inc., Newark, CA (US)

( * ) Notice: Subject to any disclaimer, the term of this patent is extended or adjusted under 35 U.S.C. 154(b) by 128 days.

(21) Appl. No.: 09/653,062

(22) Filed: Sep. 1, 2000

(51) Int. Cl.
 *G06F 13/00* (2006.01)
(52) U.S. Cl. .................. 710/300; 710/301; 710/302; 710/303
(58) Field of Classification Search ........... 710/301, 710/302; 348/375; 713/300
See application file for complete search history.

(56) References Cited

U.S. PATENT DOCUMENTS

| | | | |
|---|---|---|---|
| 4,455,620 A | 6/1984 | Watanabe et al. | |
| 4,458,313 A | 7/1984 | Suzuki et al. | |
| 4,614,144 A | 9/1986 | Sagara et al. | |
| 4,882,473 A | 11/1989 | Bergeron et al. | |
| 4,882,476 A | 11/1989 | White | |
| 5,067,075 A | 11/1991 | Sugano et al. | |
| 5,155,663 A | 10/1992 | Harase | |
| 5,375,037 A | 12/1994 | Le Roux | |
| 5,375,084 A | 12/1994 | Begun et al. | |
| 5,434,872 A | 7/1995 | Petersen et al. | |
| 5,438,359 A * | 8/1995 | Aoki ........................ 348/375 |
| 5,457,601 A | 10/1995 | Georgopulos et al. | |
| 5,486,687 A | 1/1996 | Le Roux | |
| 5,513,074 A | 4/1996 | Ainsbury et al. | |
| 5,563,400 A | 10/1996 | Le Roux | |
| 5,606,559 A | 2/1997 | Badger et al. | |
| 5,655,917 A | 8/1997 | Kaneshige et al. | |
| 5,677,524 A | 10/1997 | Haghiri-Tehrani | |
| 5,727,168 A | 3/1998 | Inoue et al. | |
| 5,733,800 A | 3/1998 | Moden | |
| 5,742,910 A | 4/1998 | Gallant et al. | |

(Continued)

FOREIGN PATENT DOCUMENTS

DE 4416583 12/1995

(Continued)

OTHER PUBLICATIONS

"Identification Cards—Integrated Circuit(s) Cards With Contracts—Part 1: Physical Characteristics," *ISO/IEC 7816-1 First Edition*, pps. 1-3, Oct. 15, 1998.

(Continued)

*Primary Examiner*—Rehana Perveen
*Assistant Examiner*—Trisha Vu
(74) *Attorney, Agent, or Firm*—Parsons Hsue & de Runtz LLP

(57) ABSTRACT

Very small non-volatile memory cards are modified to include a connector to which a connector on a separate data input-output card electrically and mechanically mates when pushed together. The input-output card transfers data directly between an external device and the non-volatile memory, without having to go through the host to which the memory card is connected. The input-output card communicates with the external device through a wired or a wireless communication channel.

6 Claims, 4 Drawing Sheets

U.S. PATENT DOCUMENTS

| | | | |
|---|---|---|---|
| 5,752,857 | A | 5/1998 | Knights |
| 5,764,896 | A | 6/1998 | Johnson |
| 5,780,837 | A | 7/1998 | Garcia |
| 5,780,925 | A | 7/1998 | Cipolla et al. |
| 5,784,633 | A | 7/1998 | Petty |
| 5,802,325 | A | 9/1998 | Le Roux |
| 5,809,520 | A | 9/1998 | Edwards et al. |
| 5,822,190 | A | 10/1998 | Iwasaki |
| 5,831,256 | A | 11/1998 | De Larminat et al. |
| 5,831,533 | A * | 11/1998 | Kanno ............... 340/5.64 |
| 5,837,984 | A | 11/1998 | Bleier et al. |
| 5,852,290 | A | 12/1998 | Chaney |
| 5,877,488 | A | 3/1999 | Klatt et al. |
| 5,887,145 | A * | 3/1999 | Harari et al. ............ 710/301 |
| 5,909,596 | A | 6/1999 | Mizuta |
| 5,928,347 | A | 7/1999 | Jones |
| 5,933,328 | A | 8/1999 | Wallace et al. |
| 5,975,584 | A | 11/1999 | Vogt |
| 5,987,557 | A | 11/1999 | Ebrahim |
| 6,040,622 | A | 3/2000 | Wallace |
| 6,062,480 | A | 5/2000 | Evoy |
| 6,062,887 | A | 5/2000 | Schuster et al. |
| 6,069,795 | A | 5/2000 | Klatt et al. |
| 6,075,706 | A | 6/2000 | Learmonth et al. |
| 6,097,605 | A | 8/2000 | Klatt et al. |
| 6,125,409 | A | 9/2000 | Le Roux |
| 6,137,710 | A | 10/2000 | Iwasaki et al. |
| 6,140,695 | A | 10/2000 | Tandy |
| 6,145,046 | A | 11/2000 | Jones |
| 6,151,511 | A | 11/2000 | Cruciani |
| 6,151,652 | A * | 11/2000 | Kondo et al. ............ 713/300 |
| 6,175,517 | B1 | 1/2001 | Jigour et al. |
| 6,199,756 | B1 | 3/2001 | Kondo et al. |
| 6,202,109 | B1 | 3/2001 | Salo et al. |
| 6,226,202 | B1 | 5/2001 | Kikuchi |
| 6,240,301 | B1 | 5/2001 | Phillips |
| 6,244,894 | B1 | 6/2001 | Miyashita |
| 6,266,724 | B1 | 7/2001 | Harari et al. |
| 6,279,114 | B1 | 8/2001 | Toombs et al. |
| 6,311,296 | B1 | 10/2001 | Congdon |
| 6,353,870 | B1 | 3/2002 | Mills et al. |
| 6,381,662 | B1 | 4/2002 | Harari et al. |
| 6,385,677 | B1 | 5/2002 | Yao |
| 6,405,278 | B1 * | 6/2002 | Liepe ............... 711/103 |
| 6,421,246 | B1 | 7/2002 | Schremmer |
| 6,434,648 | B1 | 8/2002 | Assour et al. |
| 6,438,638 | B1 * | 8/2002 | Jones et al. ............ 710/301 |
| 6,446,177 | B1 | 9/2002 | Tanaka et al. |
| 6,457,647 | B1 | 10/2002 | Kurihashi et al. |
| 6,496,381 | B1 | 12/2002 | Groeger |
| 6,499,016 | B1 * | 12/2002 | Anderson ............ 704/275 |
| 6,524,137 | B1 | 2/2003 | Liu et al. |
| 6,612,498 | B1 | 9/2003 | Lipponen et al. |
| 6,651,131 | B1 | 11/2003 | Chong, Jr. et al. |
| 6,669,487 | B1 | 12/2003 | Nishizawa et al. |
| 6,764,017 | B1 | 7/2004 | Chen et al. |
| 6,816,933 | B1 | 11/2004 | Andreas |
| 6,845,421 | B1 | 1/2005 | Hwang et al. |
| 6,886,083 | B1 | 4/2005 | Murakami |
| 2001/0001507 | A1 | 5/2001 | Fukuda et al. |
| 2001/0021956 | A1 | 9/2001 | Okamoto et al. |
| 2001/0042149 | A1 | 11/2001 | Ito et al. |
| 2002/0103988 | A1 | 8/2002 | Dornier |
| 2003/0056050 | A1 | 3/2003 | Moro |
| 2003/0074529 | A1 | 4/2003 | Crohas |
| 2003/0084221 | A1 | 5/2003 | Jones |
| 2003/0163623 | A1 | 8/2003 | Yeung |
| 2004/0103234 | A1 | 5/2004 | Zer et al. |
| 2005/0107987 | A1 | 5/2005 | Barr et al. |

FOREIGN PATENT DOCUMENTS

| | | |
|---|---|---|
| DE | 19855596 | 6/2000 |
| EP | 0495216 A2 | 12/1991 |
| EP | 0 657 834 A1 | 6/1995 |
| EP | 0657834 A1 | 6/1995 |
| EP | 0 891 047 A2 | 1/1999 |
| EP | 1 001 348 A2 | 5/2000 |
| EP | 1037159 | 9/2000 |
| EP | 1085516 A2 | 3/2001 |
| EP | 1074906 A1 | 7/2001 |
| EP | 1278154 A1 | 1/2003 |
| FR | 2771199 | 5/1999 |
| GB | 2374204 | 9/2002 |
| JP | 60234286 | 11/1985 |
| JP | 3195052 | 8/1991 |
| JP | 5089304 | 4/1993 |
| JP | 6103429 | 4/1994 |
| JP | 6223241 | 8/1994 |
| JP | 6231318 | 8/1994 |
| JP | 7094658 | 4/1995 |
| JP | 2001-307801 | 11/2001 |
| JP | 2001282712 | 12/2001 |
| JP | 2002245428 | 8/2002 |
| JP | 2003196624 | 11/2003 |
| NL | 9301540 | 3/1995 |
| WO | 02/013021 A3 | 2/0000 |
| WO | 00/70553 | 11/2000 |
| WO | 00/70554 | 11/2000 |
| WO | 01/84490 A1 | 11/2001 |
| WO | 02/15020 A2 | 2/2002 |
| WO | 02/19266 A2 | 3/2002 |
| WO | 2004/044755 A2 | 5/2004 |
| WO | 2004/049177 | 6/2004 |

OTHER PUBLICATIONS

"Information Technology—Identification Cards—Integrated Circuit(s) Cards With Contracts—Part 2: Dimensions and Location of the Contracts," *ISO/IEC 7816-2 First Edition*, pps. 1-5, Mar. 1, 1999.

"Information Technology—Identification Cards—Integrated Circuit(s) Cards With Contracts—Part 1: Electronic signals and transmission protocols," *ISO/IEC 7816-3 Second Edition*, pps. 1-27, Dec. 15, 1997.

Wilson, James Y. and Kronz, Jason A., "Inside Bluetooth—Part 1," *Dr. Dobb's Journal*, pps. 62-70, Mar. 2000.

Wilson, James Y. and Kronz, Jason A., "Inside Bluetooth—Part 2," *Dr. Dobb's Journal*, pps. 58-64, Apr. 2000.

SanDisk MultiMediaCard Product Manual, Rev. 2 ©2000 SanDisk Corporation, pps. 2-86.

MultiMediaCard System Specification Version 2.2 Official Release © Jan. 2000 MMCA Technical Committee, pps. 2-123.

MultiMediaCard System Specification Version 2.11 Official Release © Jun. 1999 MMCA Technical Committee, pps. 2-123.

"Palm Brand Products to Feature Secure Digital (SD) Card Slot for Expansion", SD Card Association—Press Room, www.sdcard.org/press7.htm, dated Jun. 27, 2000, 4 pages.

SD Group, "SD Memory Card Specifications, Simplified Version of: Part 1 Physical Layer Specification, Version 1.01," Apr. 15, 2001, pp. 1-32.

MultiMediaCard System Specification Version 3.1 Office Release (c) Jan. 2000 MMCA Technical Committee, pp. 2-123.

ETSI, "Digital Cellular Telecommunications System (Phase2+); Specification of the Subscriber Identity Module—Mobile Equipment (SIM-ME) Interface," GSM 11.11 Version 8.3.0 Release 1999, ETSI TS 100 977 V8.3.0 (Aug. 2000), pp. 1-170.

International Standard, "Identification Cards—Physical Characteristics", ISO/IEC 7810, Second Edition, Aug. 15, 1995, pp. 1-5.

CompactFlash Association, "CF+ and CompactFlash Specification Revision 1.4", Jul., 1999, pp. 1-105.

"Identification Cards—Integrated Circuit(s) Cards With Contacts; Part 10: Electronic Signals and Answer to Reset for Synchronous Cards," International Standard, ISO/IEC 7816-10, Nov. 1, 1999, 13 pages.

MMCA Technical Committee, "The MultiMediaCard System Specification, Version 3.1", Jun., 2001, pp. 1-130.

"Olympus Camedia; Accessories At a Glance", http://www.bicos.de/media/Olympus-Zubeh%F6r.pdf, Sep. 9, 2002, 18 pages.

"Communication Relating to the Results of the Partial International Search", European Patent Office, International Searching Authority, related to corresponding application PCT/US03/35325, Jul. 2, 2004, 6 pages.

European Patent Office, International Searching Authority, "Partial International Search", from related PCT/US2004/007782, dated Oct. 8, 2004, 4 pages.

Taiwanese Patent Office, "Final Office Action Prior to Rejection", issued in Taiwan Patent Application No.: 90121510, received by facsimile Jun. 23, 2005, (2 pages).

International Search Report and Written Opinion issued in PCT/US2004/040952, mailed Apr. 29, 2005 (11 pages).

International Search Report and Written Opinion issued in PCT/US2004/040122, mailed Apr. 1, 2005 (19 pages).

"Palm Brand Products to feature Secure Digital (SD) Card Slot for Expansion", SD Card Association, N.Y., N.Y. 2001; www.sdcard.org/press7.html (4 pages).

EPO/ISA, "International Search Report and Written Opinion", mailed Oct. 13, 2004 in corresponding PCT/US2004/007782, 15 pages.

EPO/ISA, "Notification of Transmittal of the International Search Report or the Declaration", mailed Nov. 2, 2004 in PCT/US03/40042, 7 pages.

EPO/ISA, "International Search Report or the Declaration", mailed Oct. 13, 2004 in PCT/US03/35325, 9 pages.

Chinese Patent Office, Notification of the First Office Action, mailed Apr. 16, 2004 in Chinese application No. 01815704.1 (10 pages, including translation).

U.S. Office Action for Application No. 10/302,009, mailed Sep. 6, 2005, 24 pages.

U.S. Office Action for Application 10/418,910, mailed Oct. 14, 2005, 17 pages.

European Office Action, 03 783 177.3, mailed Sep. 14, 2005, 4 pages.

Official Notification of the IPO, 093138176, mailed Oct. 5, 2005, 3 pages.

U.S. Office Action for Application No. 10/741,147, mailed Nov. 23, 2005, 25 pages.

U.S. Office Action for Application No. 10/293,985, mailed Jan. 9, 2006, 15 pages.

U.S. Office Action for Application No. 11/075,438, mailed Jan. 24, 2006, 9 pages.

PCT/International Bureau, International Preliminary Exam Report, dated Nov. 3, 2005, 11 pages.

U.S. Office Action for Application No. 11/303,220, mailed Mar. 10, 2006, 19 pages.

U.S. Office Action for Application No. 10/732,149, mailed Feb. 14, 2006, 32 pages.

European Office Action for European Patent Application No. 04 719 867.6, mailed Mar. 9, 2006, 3 pages.

Taiwanese Patent Office, "Preliminary Notice of Rejection From IPO", issued in Taiwan Patent Application No.: 093139258, received by facsimile Feb. 16, 2006, 2 pages.

* cited by examiner

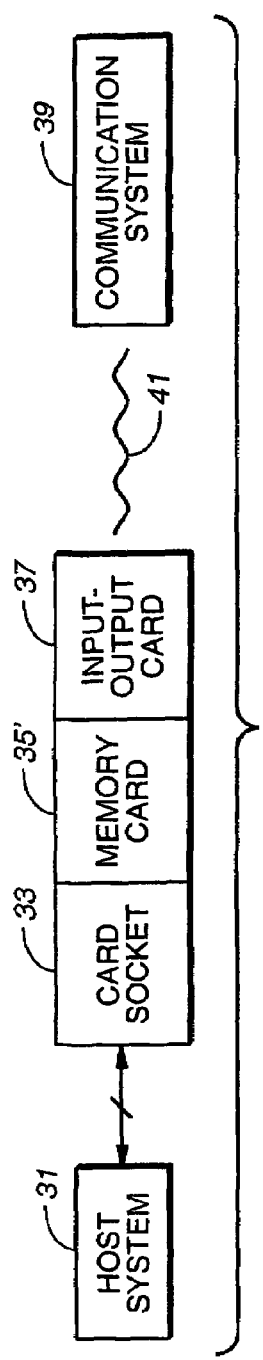
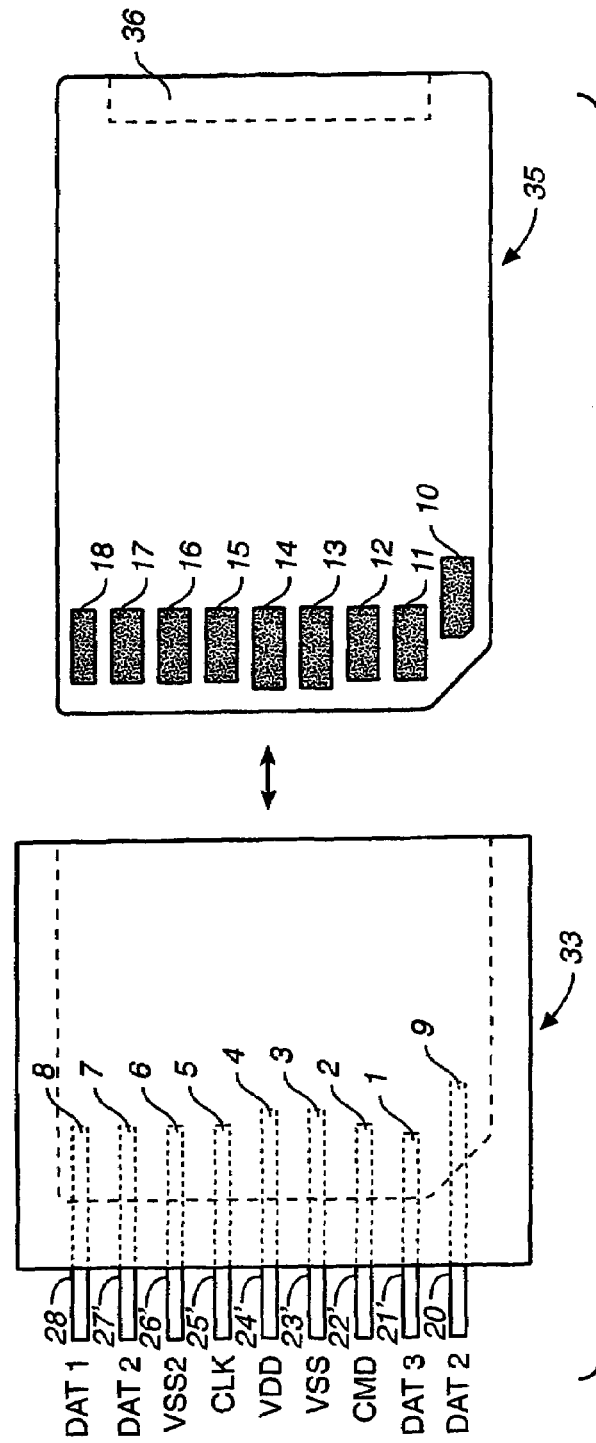

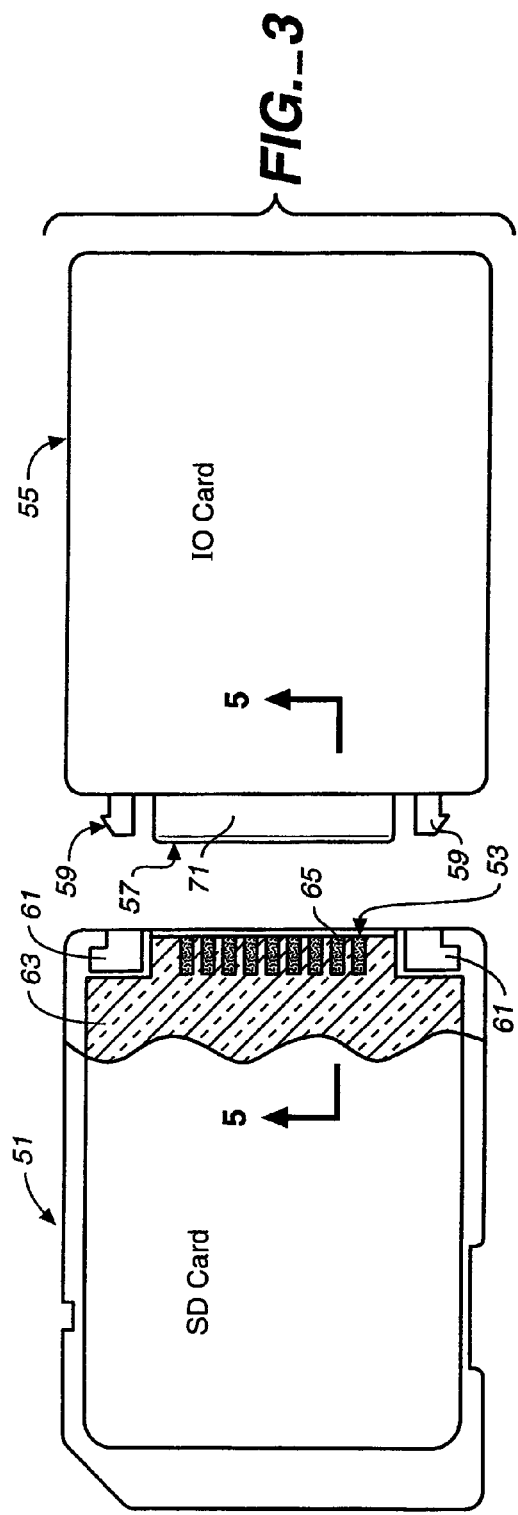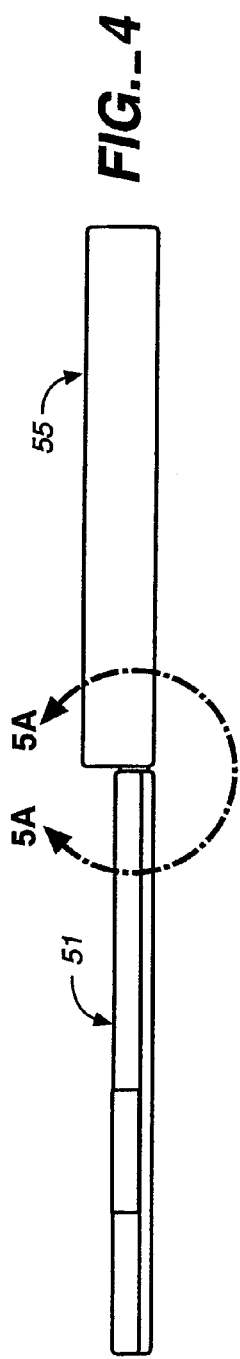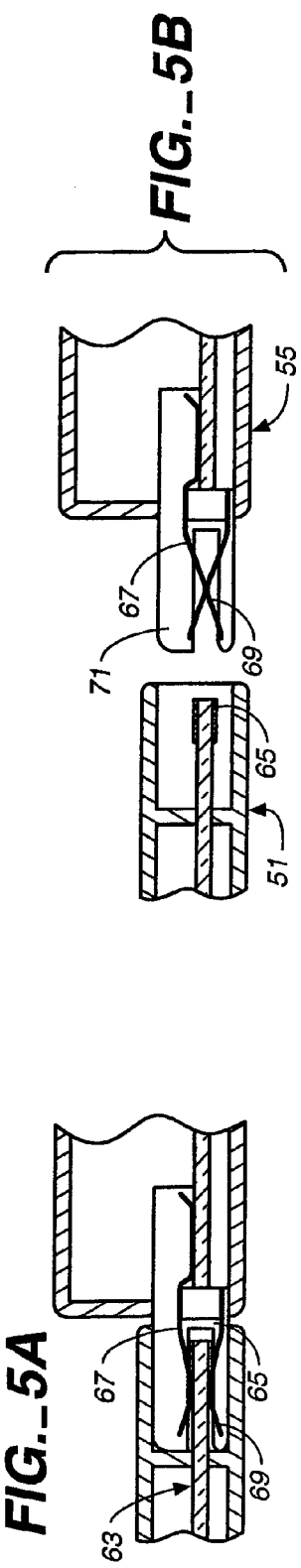

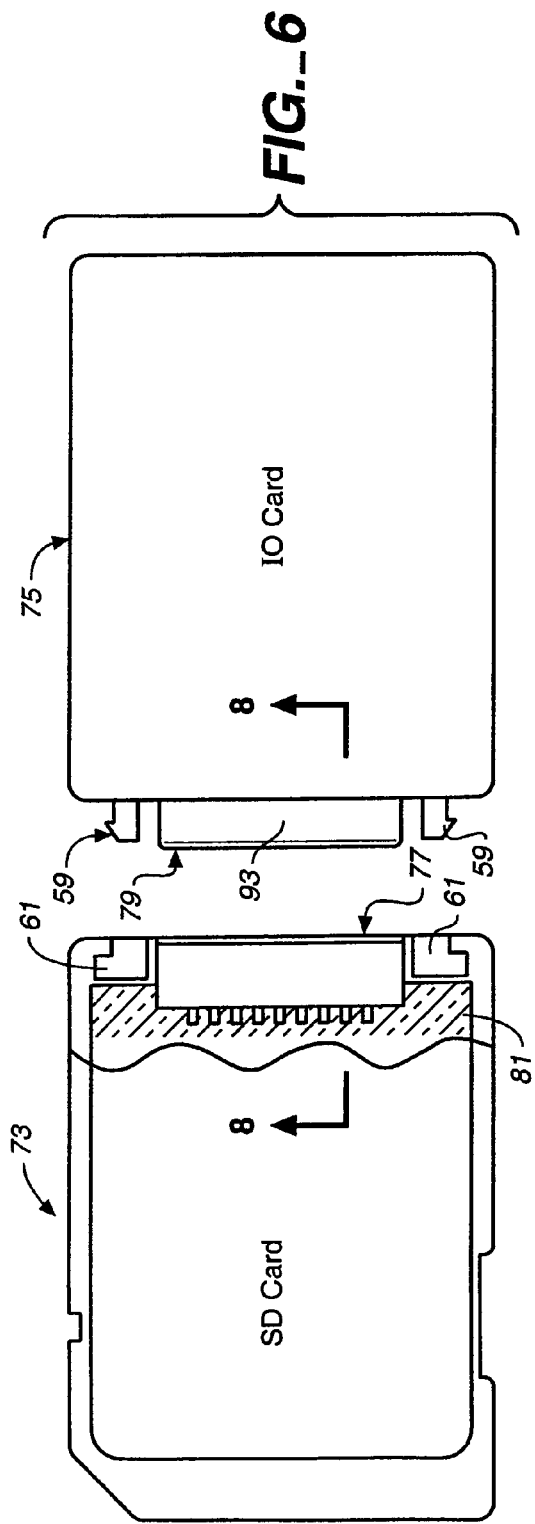
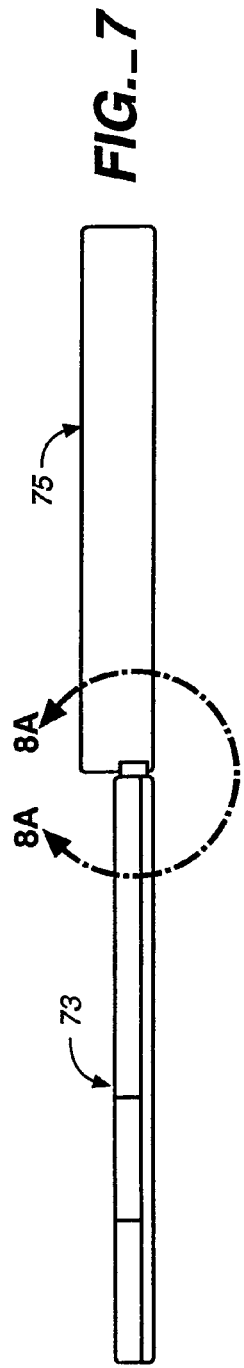
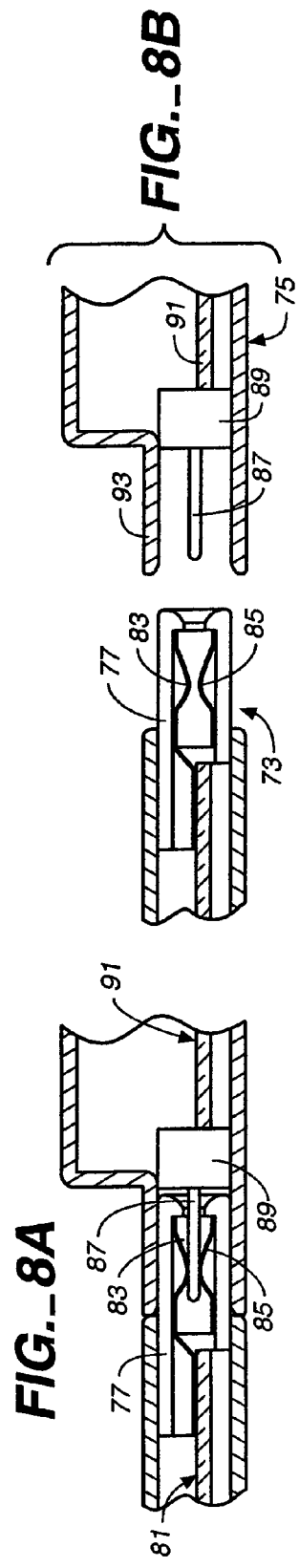

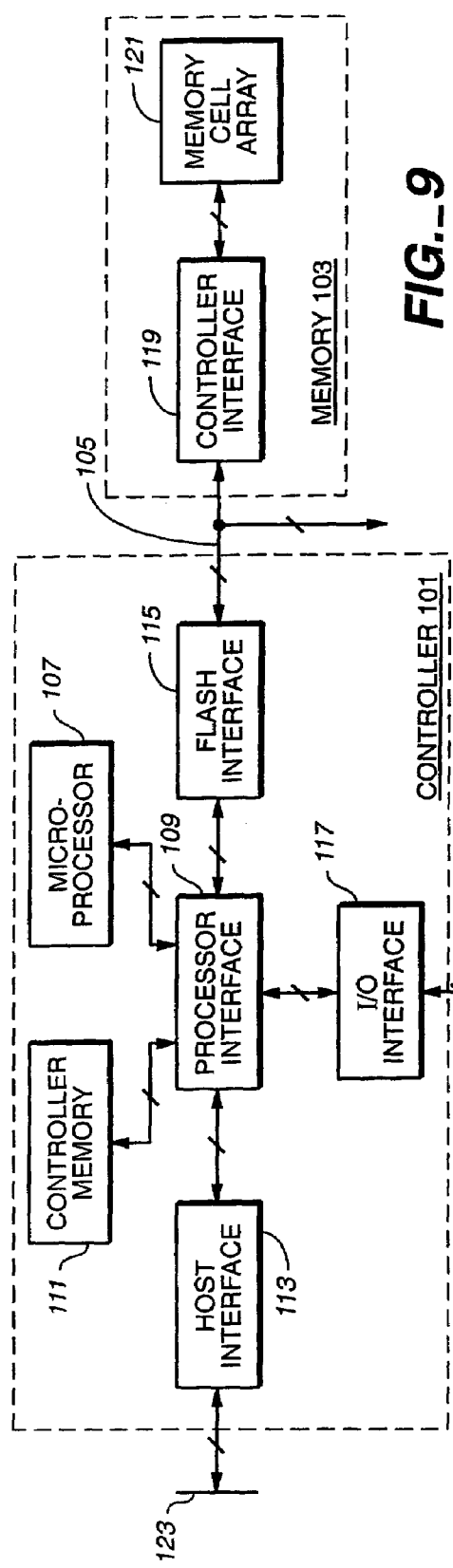
FIG._9
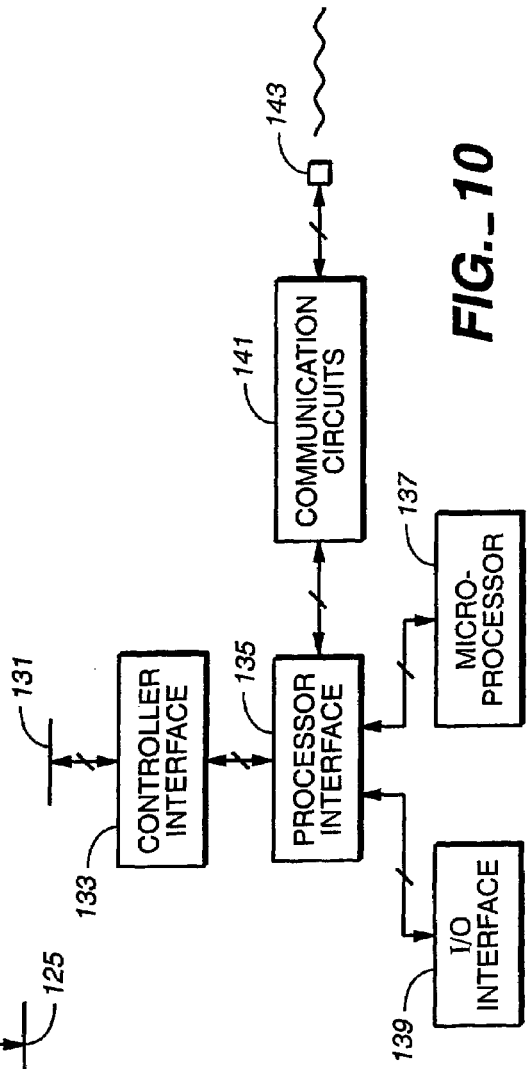
FIG._10

COOPERATIVE INTERCONNECTION AND OPERATION OF A NON-VOLATILE MEMORY CARD AND AN INPUT-OUTPUT CARD

BACKGROUND OF THE INVENTION

This invention relates, generally, to the use and structure of removable electronic circuit cards and, more specifically, to the interconnection and use together of non-volatile memory cards and input-output ("I/O") cards.

Various commercially available non-volatile memory cards that are becoming popular are extremely small and have different mechanical and/or electrical interfaces. Examples include the related MultiMediaCard ("MMC") and Secure Digital ("SD") memory cards that are available from SanDisk Corporation of Sunnyvale, Calif., assignee of the present application. There are other cards that conform to standards of the International Organization for Standardization ("ISO") and the International Electrotechnical Commission ("IEC"), an example that is widely implemented being known as the ISO/IEC 7816 standard.

The physical and electrical specifications for the MMC are given in "The MultiMediaCard System Specification" that is updated and published from time-to-time by the MultiMediaCard Association ("MMCA") of Cupertino, Calif. Versions 2.11 and 2.2 of that Specification, dated June 1999 and January 2000, respectively, are expressly incorporated herein by this reference. MMC products having varying storage capacity up to 64 megabytes in a single card are currently available from SanDisk Corporation, and capacities of 128 megabytes are expected to be available in the near future. These products are described in a "MultiMediaCard Product Manual," Revision 2, dated April 2000, published by SanDisk corporation, which Manual is expressly incorporated herein by this reference. Certain aspects of the electrical operation of the MMC products are also described in co-pending patent applications of Thomas N. Toombs and Micky Holtzman, Ser. Nos. 09/185,649 and 09/186,064, both filed Nov. 4, 1998, and assigned to SanDisk Corporation. The physical card structure and a method of manufacturing it are described in U.S. Pat. No. 6,040,622, assigned to SanDisk Corporation. Both of these applications and patent are also expressly incorporated herein by this reference.

The newer SD Card is similar to the MMC card, having the same size except for an increased thickness that accommodates an additional memory chip. A primary difference between them is that the SD Card includes additional data contacts in order to enable faster data transfer between the card and a host. The other contacts of the SD Card are the same as those of the MMC card in order that sockets designed to accept the SD Card will also accept the MMC card. The electrical interface with the SD card is further made to be, for the most part, backward compatible with the MMC product described in version 2.11 of its specification referenced above, in order that few changes to the operation of the host need be made in order to accommodate both types of card. Certain aspects of the SD card are described in U.S. patent application Ser. No. 09/641,023, filed Aug. 17, 2000, which application is incorporated herein by this reference.

Cards made according to the ISO/IEC 7816 standard are of a different shape, have surface contacts in different positions, and a different electrical interface than the MMC and SD Cards. The ISO/IEC 7816 standard has the general title of "Identification cards—Integrated Circuit(s) Cards with Contacts," and consists of parts 1–10 that carry individual dates from 1994 through 2000. This standard, copies of which are available from the ISO/IEC in Geneva, Switzerland, is expressly incorporated herein by this reference. ISO/IEC 7816 cards are particularly useful in applications where data must be stored in a secure manner that makes it extremely difficult or impossible for the data to be read in an unauthorized manner. The small ISO/IEC 7816 cards are commonly used in cellular telephones, among other applications.

Currently, data is transferred between the memory card and some external device through the host system to which the memory card is connected. Not all host systems with which such memory cards are used are particularly adapted to so transfer certain types or large amounts of data in a fast, efficient and convenient manner.

SUMMARY OF THE INVENTION

Therefore, the present invention, briefly and generally, utilizes a separate input-output card that is electrically and mechanically attached to a memory card so that data transfers may be made through the input-output card directly to and from the memory when the memory card is inserted into the host system but without having to pass the data through the host system. The data transfer is preferably accomplished independently of the host system, except for the host supplying power, a clock signal, and possibly other like support, to both cards during such a data transfer directly with memory card. The controller of the memory card is modified so that is can also act as a controller to such direct data transfer between the memory card and the input-output card.

In a preferred form, connectors are formed on mating edges of the memory and input-output cards that are easily but firmly latched when laterally pushed together so that the two cards form a unit that may be handled as a single card. One of the card connectors, for example, contains resilient metal fingers between which mating metal pins or printed circuit board edge conductors of the other card connector are inserted when the connectors are pushed together. The connectors are prevented from inadvertently separating by a latch that automatically engages between them when the two connectors are initially pushed together. No separate rotation or other motion is required to attach the connectors, nor is a separate latching operation necessary.

Additional details, features and advantages of the present invention will become apparent from the following description, which should be taken in conjunction with the accompanying drawings.

BRIEF DESCRIPTION OF THE DRAWINGS

FIG. 1 illustrates a system in which a combination of a non-volatile memory card and an input-output card are utilized;

FIG. 2 shows the pin assignments of an example memory card and system socket in which the card is inserted;

FIG. 3 shows the memory card of FIG. 2 with a first embodiment of an added connector and an input-output card with a mating connector;

FIG. 4 is an outer view of the memory and input-output cards of FIG. 3 connected together;

FIGS. 5A and 5B are cross-sectional views of the memory and input-output card connectors of FIGS. 3 and 4 taken at section 5—5 of FIG. 3, FIG. 5A showing the connectors engaged and FIG. 5B showing them separated;

FIG. 6 shows the memory card of FIG. 2 with a second embodiment of an added connector and an input-output card with a mating connector;

FIG. 7 is an outer view of the memory and input-output cards of FIG. 6 connected together;

FIGS. 8A and 8B are cross-sectional views of the memory and input-output card connectors of FIGS. 6 and 7 taken at section 8—8 of FIG. 6, FIG. 8A showing the connectors engaged and FIG. 8B showing them separated;

FIG. 9 is an electronic block diagram of the memory cards of FIGS. 3 and 6; and FIG. 10 is an electronic block diagram of the input-output cards of FIGS. 3 and 6.

DESCRIPTION OF SPECIFIC EMBODIMENTS

With reference to FIG. 1, a host electronic system 31 is illustrated to include a socket 33 into which one or more types of commercially available memory cards summarized in the Background above may be inserted and removed by the user. The host 31 may be a personal computer, in desktop or notebook form, which includes the socket 33 that receives such a memory card. Other examples of host systems containing such a card socket include various portable electronic devices, such as hand held computers, personal organizers, other personal digital assistants ("PDAs"), cellular telephones, music players, and the like. Additionally, auto radios and global position system ("GPS") receivers also can have such a memory card socket. The improvements of the present invention have application to a wide variety of host systems that include a memory card socket.

In the examples described herein, the SD card is described but it will be understood that the invention is not limited to implementation with any specific type of memory card. In FIG. 2, the physical configuration of a SD card 35 and a mating socket 33 are shown. The SD card is rectangular in shape, having dimensions of 24 millimeters by 32 millimeters, with a thickness of 2.1 millimeters and narrow rails (not shown in FIG. 2) along the longer sides of the card that are 1.4 millimeters thick. The present invention may be implemented with a memory card having one of a wide variety of sizes but has a high degree of usefulness with memory cards that are less than 50 millimeters in length, 40 millimeters in width and 3 millimeters in thickness.

The SD card 35 contains nine surface electrical contacts 10–18. Contacts 13, 14 and 16 are connected to power ($V_{SS}$, $V_{DD}$ and $V_{SS2}$) when inserted into the host system socket 33. Card contact 15 receives a clock signal (CLK) from the host. Contact 12 receives commands (CMD) from the host and sends responses and status signals back to the host. The remaining contacts 10, 11, 17 and 18 (DAT 2, DAT 3, DAT 0 and DAT 1, respectively) receive data in parallel for storage in its non-volatile memory and send data to the host in parallel from the memory. A fewer number of data contacts are selectable for use, such as a single data contact 17. The maximum rate of data transfer between the host and the card is limited by the number of parallel data paths that are used. The MMC card described in the Background above has a similar contact layout and interface but omits the data pins 10 and 18 and does not use the contact 11, which is provided as a spare. The MMC card has the same dimensions and operates similarly to the SD card except that the card is only 1.4 millimeters thick and has a single data contact 17. The contacts of the card 37 are connected through respective pins 20–28 of the socket 33 to its host system.

The present invention includes modifying a memory card, such as the memory card 35, by adding a connector, such as indicated at 36, the modified card being identified as 35' in FIG. 1. The connector 36 attaches to a mating connector of an input-output card 37 in order to mechanically and electrically couple the two cards together. The input-output card 37 communicates directly with some other system 39 over a communications path 41. The communications path 41 can be wireless, such as by use of an infra-red or radio frequency signal, or can include a wired connection. If by wires, the input-output card 37 includes an external socket to removably receive a plug that is attached to the wires. If wireless, the card 37 includes an antenna within it, if using radio frequency communication, or an infra-red emitter and detector, if infra-red communications is being used. An emerging standard for radio frequency data communication has been published as the Bluetooth Specification, which is discussed by Wilson and Kronz, in two articles entitled "Inside Bluetooth Part I" and "Inside Bluetooth Part II", appearing in the issues of *Dr. Dobb's Journal* for March, 2000 (beginning at page 62) and April 2000 (beginning at page 58), which articles are incorporated herein by this reference. The transfer of data over the communications path 41 will usually be in two directions but can certainly be limited to one direction or the other for specific applications.

One or more of a number of input-output functions may be included in the card 37. A modem is one example, where the communicating system 39 is a telephone system. A general data transfer function likely has a high degree of usefulness because of the wide variety of types of data that users want to transfer. This includes the transfer of audio and video data, large database files, games and various other computer programs. Such data is transferred directly between the remote system 39 and the memory card 35' without having to go through the host system 31 of which the card 35' is a part. This is a form of direct memory access ("DMA"), and has particular advantages when long streams of data are being transferred. The host 31 need not have the hardware or software to handle such data and the communications function. This is performed entirely by the peripheral input-output card 37 and memory card 35'. Any limitations of the host system 31 for handling high speed data transfers, a limited internal memory capacity, or the like, do not limit transfers of data directly with the memory card 35'. The host 31 does, however, provide power and a clock signal to the memory card 35' which are also used by the input-output card 37.

The mechanical and electrical interconnection of the memory and input-output cards is illustrated, according to one embodiment, in FIGS. 3, 4, 5A and 5B. An SD card 51 is shown in FIG. 3 from its side opposite to that containing the external contacts. A connector 53, for coupling with an input-output card 55, is provided at an end of the SD card 51 opposite to the end carrying the card's external contacts. The connector 53 is shown with a covering portion of the card outside shell removed. A mating connector 57 is included along an edge of the input-output card 55. A pair of pins 59 are carried by the card 55 and extend outward from its end on opposite sides of its connector 57. Mating apertures 61 are included on the edge of the card 51 on opposite sides of its connector 53. When the cards 51 and 55 are urged together, the pins 59 are inserted into their mating apertures 61, with the pins 59 flexing sufficiently for their pointed sides to be caught within detents of their mating apertures 61. This prevents the cards from being pulled apart until the pins 59 are flexed to release their engagement with the detents of the apertures 61. While so attached, the mating connectors 53 and 57 also establish electrical connection between the two cards.

In the specific example shown, the connector 53 includes 9 metal contacts formed directly on an end of a printed circuit board 63 of the SD card 51. Each of these contacts, such as a contact 65 shown in FIGS. 5A and 5B, is wrapped around the edge of the board 63. A similar number of spring loaded contacts, such as metal spring elements 67 and 69 forming one such contact, are urged against their respective metal contacts of the card 51 when that card is inserted between the spring elements. Since the spring elements protrude outward of the end of the input-output card 55, they are protected from damage by a rigid cover 71 that extends along the entire width of the connector 57. When the cards 51 and 55 are so coupled together, there are multiple separate electrical wires (9 in this example) that connect a memory controller within the SD card 51 with the communications circuits of the input-output card 55.

A second embodiment of the mechanical and electrical interconnection of an SD card 73 with an input-output card 75 is illustrated in FIGS. 6, 7, 8A and 8B. In this case, mating connectors 77 and 79 have a different structure, although connection is also made by urging the mating edges of the two cards together. Once connected, the cards are held together against separation by the same pins 59 and aperture 61 as in the first embodiment. Of course, in this and the first embodiment, any other convenient known mechanical latch mechanism suitable for such small cards may be alternatively be employed.

In this second embodiment, the connector 77 is added on to the end of the printed circuit board 81 that is internal to the SD card. Each electrical contact includes a pair of resilient elements 83 and 85 that are urged toward each other. The connector on the input-output card 75 includes a number of pins, such as a pin 87, that is positioned to be inserted between the pair of resilient elements 83 and 85 that are in the same position as the pin along the width of the cards' mating edges. These pins are supported by a connector block 91 that is attached to an end of a printed circuit board 91 within the input-output card 75. The extending pins are also mechanically protected by an extension 93 of the card 75 outer housing that surrounds the pins.

An advantage of the card connection mechanisms described above is that they firmly attach the memory and input-output cards together by a simple lateral motion pushing the connectors together. Once attached, they can be handled as a single card, such as being removed from or inserted into the memory card socket of the host system.

There are no particular restrictions on the size of the input-output cards 55 and 75 but it is preferable that they be made as small and light as possible. A size in plan view of less than 50 millimeters in length and 40 millimeters in width is quite convenient when being attached to memory cards that are also less that this size. The thickness of the input-output cards may need to be made more than that of the SD memory cards in order to accommodate an additional number of integrated circuit chips and/or an antenna for radio frequency communication. But the input-output card thickness can be made less than 6 millimeters, and often less than 4 millimeters. The width of the input-output card along its edge containing the connector is most conveniently made to be substantially the same as the width of the memory card along its edge containing the mating connector.

Referring to FIG. 9, the electronic system within a modified SD card 51 and 73 is illustrated in block diagram form. A controller 101 communicates with one or more memory units 103 over lines 105. The controller includes a microprocessor 107 and its interface circuits 109. The interface circuits 109, in turn, are interconnected with a memory 111, host interface circuits 113, memory interface circuits 115 and circuits 117 to interface with an input-output card. The memory unit 103 includes a controller interface connected to the lines 105 and a flash memory cell array 121. The controller 101 and each memory unit 103 are usually provided on separate integrated circuit chips attached to and interconnected on the card's printed circuit board, but the trend is to combine more onto single chips as improving processing technology allows.

A connector schematically indicated at 123 that is connected to the host interface 113 includes the surface contacts of the SD card that are inserted into the card socket 33 (FIGS. 1 and 2). A connector schematically indicated at 125 that is connected to the input-output interface represents the connectors 53 and 77 of the respective embodiments described with respect to FIGS. 3–8B. Thus, the memory controller of the memory card has been modified to allow it to control the flow of data with an input-output card that is connected to the memory card, as well as to continue to control the flow of data with the host system. The controller 101 controls flow of commands and data between the memory units 103, a host to which the memory card is connected and any input-output card connected with the memory card. If no input-output card is so connected, the controller 101 manages operation of the memory units 103 and their communication with the host in substantially the same manner as it does in current SD cards.

The electronic system within the input-output cards 55 and 75 is schematically shown in FIG. 10. A connector 131 corresponds to the connectors 57 and 79 of the embodiments of FIGS. 3–8B. It is connected with a controller interface circuit 133, which, in turn, is connected with a processor interface circuit 135. A micro-processor 137 that controls operation of the input-output card, and a memory 139, are also connected with the processor interface 135. Finally, circuits 141 are further connected with the processor interface 135 for interfacing between the processor and signals or data that are sent and/or received through a transmission device 143. If wired communication is used, the device 143 is a receptacle for a plug. If wireless using radio frequencies, the device 143 is an antenna. If wireless using infra-red communication, the device 143 includes an emitter and/or detector of an infra-red radiation signal. In any event, the micro-processor 137 controls the transfer of data between the device 143 and the connector 131.

Although various aspects of the present invention have been described with respect to specific embodiments, it will be understood that the invention is protected within the full scope of the appended claims.

It is claimed:

1. A data storage and transfer system including an enclosed rectangularly shaped memory card and an enclosed input-output card, wherein:
   (A) the memory card comprises:
      first and second sets of externally accessible electrical contacts positioned along respective first and second edges thereof,
      a re-programmable non-volatile flash memory contained therein for the storage of data,
      a controller contained therein, said controller being connected to the memory and to the first and second sets of electrical contacts, the controller managing operation of the memory and causing data to be transferred (a) between the memory and through the first set of contacts to a host system connected therewith, and (b) between the memory and through the second set of contacts to the input-output card connected therewith without passing through the first set of contacts, and a mechanism provided on an outside of the memory card along the second edge thereof for connection to the input-output card, and (B) the input-output card comprises:

a third set of externally accessible electrical contacts along one edge thereof with a pattern complementary to that of the second set of contacts, a mechanism provided on an outside of the input-output card along said one edge thereof that mates with the mechanism on the memory card in order to allow removable connection together of the memory and input-output cards along their respective second and one edges such that their respective second and third set of electrical contacts mate when the cards are connected together, communication circuits contained therein and connected with the third set of contacts for transferring data therethrough, and a data transmission and reception device connected to the communications circuit for transferring data between the communications circuit and an object external to the input-output card, whereby data are transferable between the object via the data transmission and reception device of the input-output card and the flash memory of the memory card through the second and third sets of contacts without passing through the first set of contacts.

2. The system according to claim 1, wherein the data transmission and reception device includes an antenna mounted within the input-output card.

3. The system according to claim 1, wherein the data transmission and reception device includes a wire connector accessible from outside of the input-output card.

4. The system according to claim 1, wherein the first set of contacts of the memory card physically and electrically follows a Multi-Media Card (MMC) standard.

5. The system according to claim 1, wherein the first set of contacts of the memory card physically and electrically follows a Secure Digital (SD) standard.

6. The system according to claim 1, wherein first and second edges of the memory card are opposite each other.

* * * * *